United States Patent Office 2,969,321
Patented Jan. 24, 1961

2,969,321

DRILLING FLUIDS AND METHOD OF USING SAME

Paul G. Carpenter, Bartlesville, Okla., assignor to Phillips Petroleum Company, a corporation of Delaware No Drawing. Filed Dec. 3, 1956, Ser. No. 625,588

10 Claims. (Cl. 252—8.5)

This invention relates to oil-base drilling fluids. In one aspect this invention relates to oil-base drilling fluids possessing improved properties, especially a low fluid loss. In another aspect, this invention relates to methods of using oil-base drilling fluids.

In the art of drilling wells, especially by the rotary method, there are disadvantages attendant upon the use of water-base drilling muds, particularly in drilling and coring low pressure horizons. Oil-base drilling fluids have been found quite advantageous for these and other applications. Oil-base drilling fluids weighing less than 8.3 pounds per barrel can be readily prepared, and the use of such lightweight material reduces the penetration by water of the low pressure horizon to a negligible quantity. Moreover, cores can be recovered in an "in situ" condition, and no swelling or sloughing is experienced in the presence of hydrous clays and bentonites with elimination of the resulting difficulties arising from reduced porosity or "pipe sticking."

However, oil-base drilling fluids are sometimes disadvantageous in that they are characterized by low viscosity and have high fluid losses.

An object of this invention is to provide an improved oil-base drilling fluid. Another object of this invention is to provide an improved oil-base drilling fluid having low fluid loss properties. Still another object of this invention is to provide a method of using an oil-base drilling fluid. Other objects, advantages and aspects of the invention will be apparent to those skilled in the art in view of this disclosure.

In accordance with this invention, a polymer of 1-butene is added to the oil base to provide a drilling fluid having a low fluid loss, without increasing the viscosity of the drilling fluid to such an extent that it cannot be circulated, and without detracting from the advantages of oil-base drilling fluids as noted above.

The amount of poly-1-butene added to the oil base varies from well to well, and the optimum amount is readily determined under any given set of conditions by withdrawing a portion of the drilling fluid and testing it with various amounts of the particular poly-1-butene to be incorporated therein. Thus one can determine the exact amount necessary to yield the desired properties in a drilling fluid and avoid the use of costly excessive amounts. While, therefore, the amount employed is not of the essence of the invention, it can be stated that the additive will normally be incorporated in an amount within the range of 1 to 100 pounds per barrel (42 gallons) of drilling fluid and, usually for most purposes, within the more restricted range of 5 to 50 pounds per barrel.

The oils used in my invention are usually petroleum oils, although other oleaginous materials such as vegetable and animal oils can be used, though seldom with economic advantage. The oils in any event should contain at least some material boiling above the gasoline boiling range, i.e. above 400° F. at atmospheric pressure. Oils with too high a content of highly volatile hydrocarbons in the gasoline boiling range are undesirable because of the danger of fire, and because of the low viscosity. Preferred oils are topped crude oils, gas oils, kerosene, diesel fuels, heavy alkylates, fractions of heavy alkylate such as the "Soltrols" (described hereinafter), and the like.

The drilling fluid is formed simply by adding the poly-1-butene additive to the oil base. It will be understood that the drilling fluid thus formed is circulated, usually down through the drill bit and then up through the annulus between the drill pipe and the walls of the hole. The drilling fluid contains sufficient of said additive so that when said drilling fluid is circulated, as described, there is formed a thin but substantially impervious filter cake on the wall of the hole; yet the viscosity of the drilling fluid is not increased to such an extent that it cannot be circulated. The thin filter cake formed by the drilling fluids of the invention is very advantageous in coring operations and in drilling wells in low pressure horizons. The drilling fluid serves to carry cuttings derived from the drilling operation to the surface and to maintain these cuttings in suspension if rotation of the drill bit is stopped. This is accomplished by the property possessed by the present drilling fluids of setting into a gel capable of holding the cuttings in suspension when circulation of the drilling fluid is stopped. Also, the present drilling fluids have the property of reverting from the gel state to a pumpable fluid upon resumption of the drilling operations.

Another function of the drilling fluid, when utilized in a well as indicated, is to cool and lubricate the drill bit.

The specific poly-1-butene additive used in the examples given hereinafter was prepared by passing a feed stream of about 4 weight per cent 1-butene in isooctane over a fixed bed of chromium trioxide on silica-alumina catalyst (2.5 weight percent chromium) at a liquid hourly space velocity of 1.9, a pressure of about 450 p.s.i.g., and a temperature of about 190° F. Under these conditions, approximately 58 percent of the olefin was converted to a polymer which was removed from unreacted olefin and isooctane by distillation. The polymer thus formed was a paste-like material. About 25 percent of the polymer thus formed boiled below 850° F. Said polymer was completely soluble in methylisobutyl ketone at 200° F. and about 8.7 weight percent was soluble in methylisobutyl ketone at 90° F. The viscosity of the fraction boiling above 850° F. and soluble in methylisobutyl ketone at 90° F. was 162 centipoises at 260° F.

The above described chromium trioxide catalyst was prepared by dipping commercially available silica-alumina cracking catalyst pellets (approximately 5/32 x 5/32-inch) for about 10 minutes in a 0.8 molar solution of chromium trioxide. The pellets were then freed of excess solution by filtering and were dried by heating with stirring. The dried pellets were then activated by heating for five hours at 950° F. in a stream of dry air.

The above described operating conditions and catalyst were those employed in the preparation of the specific poly-1-butene used in examples described hereinafter. It is to be understood that the invention is not limited to the specific poly-1-butenes prepared in this specific manner. Polymers of 1-butene prepared at other operating conditions and using other catalysts are also within the scope of the invention. For example, the temperature employed can be within the range from about 100° F. to about 500° F., preferably 150 to 250° F.; the pressure can be within the range of about 100 p.s.i.g. to about 700 p.s.i.g. or higher, if desired; the feed rate can range from 0.1 to 20 liquid hourly space velocity with a preferred range of 1 to 6 liquid hourly space velocity in a liquid-phase process with fixed-bed catalyst. The polymerization can be effected with a fixed-bed catalyst or a mobile catalyst.

The chromium oxide catalyst can be prepared by impregnation of particulate thoria, zirconia, silica, alumina, or silica-alumina, for example, with a solution of chromium oxide or a compound convertible to chromium oxide by calcination, followed by drying and activation of the composite at a temperature within the range of 450 to 1500° F.; preferably 750 to 1500° F., for a period of 3–10 hours or more. Starting materials other than chromium trioxide include chromic nitrate, chromic acetate, chromic chloride, chromic sulfate, ammonium chromate, ammonium dichromate, and other soluble salts of chromium. The amount of chromium, as chromium oxide, in the catalyst can range from 0.1 to 10 or more weight percent. At least part of said chromium should be in the hexavalent state at the initial contacting of hydrocarbon with said catalyst. A particularly effective support is a coprecipitated 90 percent silica–10 percent alumina support.

Further and more detailed descriptions of methods of preparing polymers of 1-butene and the above described chromium oxide catalysts can be found in the copending application of J. P. Hogan et al., Serial No. 573,877, filed March 26, 1956, now Patent 2,825,721, wherein the above described method of polymerizing 1-butene and the above described catalysts are disclosed and claimed.

While polymers of 1-butene prepared in accordance with the above described methods are the presently preferred drilling fluid additives of the invention, other polymers of 1-butene prepared by other methods known to the art are included within the scope of the invention. The only requirement is that said other polymers be sufficiently soluble or dispersable in the oil base to provide the desired decrease in fluid loss values, without increasing the viscosity of the drilling fluid to the extent that it cannot be circulated, or without other adverse effect sufficient to destroy the utility of the drilling fluid.

The following examples are illustrative of results obtainable when a polymer of 1-butene is added to an oil-base drilling fluid. The indicated amounts of the poly-1-butene were added to Soltrol 170 and the mixture was heated to a temperature of about 140° F. with stirring to obtain clear sols. In runs 2 and 3, the mixture was cooled to room temperature (about 75–80° F.). In runs 4 and 5, the mixture was cooled in an ice bath to substantially below room temperature (about 40–45° F.). The sols became hazy upon cooling. API Code 29 properties were determined with a Model 35 Fann V-G multi-speed viscosimeter, and filter presses. The procedure for determination of the API Code 29 properties employing the Fann V-G viscosimeter is described by Chisholm and Cohen, Petroleum Engineer, 26 (4), B–87 to B–90 (April 1954). The results of these tests are given in Table I below:

Table I

| Run No. | Amt. of Polymer in Oil Base, Lbs. per bbl. | Fluid Loss, ml. in 30 Min. | Gel Strength, Grams, 10 Min. | Apparent Viscosity, Centipoise | Plastic Viscosity, Centipoise | Yield Value, Lbs./100 Ft.$^2$ |
|---|---|---|---|---|---|---|
| 1 | 0 | (¹) | 0 | 3 | 3 | 0 |
| 2 | 13.5 | 14 | 1 | 4 | 4 | 0 |
| 3 | 27.0 | 4 | 1 | 5 | 4 | 2 |
| 4 | 13.5 | 17 | | | | |
| 5 | 27.0 | 19 | | | | |

¹ 2.75 ml. in 15 sec.

From the above tabulation, it is readily seen that the poly-1-butene markedly decreases the fluid loss of the drilling fluid without increasing the viscosity of said fluid to the extent that it cannot be circulated. From these data, it is evident that the amount of poly-1-butene which can be employed in the drilling fluids of the invention, can be varied over a wide range. It is usually preferred to use sufficient poly-1-butene to give a fluid loss value of 50 milliliters or less, more preferably an amount sufficient to give a fluid loss value of less than 20 ml. in 30 minutes.

The Soltrols are fractions of a petroleum heavy alkylate prepared by alkylating isobutane with monoolefins using a catalyst such as hydrogen fluoride, aluminum chloride, sulfuric acid, and the like. The word "Soltrol" is a trademark and different grades of Soltrols, having different boiling ranges are available commercially from Phillips Petroleum Company. Soltrol 170 boils within the range of about 420 to 475° F., has a specific gravity within the range of 0.77 to 0.78, minimum flash point of 190° F., and a minimum aniline point of 195° F. Some properties of a typical Soltrol 170 prepared by hydrofluoric acid alkylation of isobutane with a mixture of butenes are set forth in the following Table II.

Table II

Distillation range:
  Initial boiling point, °F. _____ 424
  10% _____ 429
  50% _____ 437
  90% _____ 448
  End point _____ 463
API gravity at 60° F. _____ 51.6
Bromine No. _____ 1.1
Aniline point, °F. _____ 198
Flash point, TCC, °F. 760 mm. _____ 192

The Soltrols are composed essentially of isoparaffinic and branched chain hydrocarbons.

It will be understood that other additives can be added to the drilling fluids of this invention without departing from the scope of the invention. Thus, special materials are oftentimes added to drilling fluids for particular purposes, and such additional materials can be employed in conjunction with the present drilling fluids, providing a usual and conventional test of the additional additives indicates a lack of obvious adverse reactions, and such additional additives are applicable in the drilling fluids with few, if any, exceptions.

Materials commonly used for increasing the weight of the oil-base fluids include limestone, barite, lead sulfide, oyster shells, and the like, in a fine subdivided state. Materials commonly used to improve the physical properties include oil-wetted or oil-wettable substances such as carbon black, or other very highly dispersed voluminous materials such as magnesium oxide, diatomaceous earth, and the like.

While the invention has been described in connection with present, preferred embodiments thereof, it is to be understood that this description is illustrative only and is not intended to limit the invention.

I claim:
1. An oil base drilling fluid comprising an oil at least part of which boils above 400° F. and which is selected from the group consisting of topped crude oil, gas oil, kerosene, diesel fuel, heavy alkylate, fractions of heavy alkylate, and mixtures thereof, and an amount of a polymer of 1-butene sufficient to reduce the fluid loss due to filtration without increasing the viscosity of said drilling fluid to such an extent that it cannot be circulated, said polymer having been prepared by polymerizing 1-butene at a polymerization temperature within the range of about 100 to about 500° F. and a pressure within the range of about 100 to about 700 p.s.i.g. in the presence of a catalyst active for such polymerization and comprising, as the sole essential effective catalytic ingredients thereof, chromium oxide and at least one material selected from the group consisting of silica, alumina, zirconia, and thoria, at least part of the chromium being in the hexavalent state at the initial contacting of hydrocarbon with said catalyst.

2. An oil base drilling fluid according to claim 1 containing from 1 to 100 pounds per barrel of said polymer of 1-butene.

3. As a drilling fluid, a petroleum oil suitable for use in drilling fluid and selected from the group consisting of topped crude oil, gas oil, kerosene, diesel fuel, heavy alkylate, fractions of heavy alkylate, and mixtures thereof, and containing a sufficient amount of a polymer of 1-butene as to reduce the fluid loss due to filtration without increasing the viscosity of said drilling fluid to such an extent that it cannot be circulated, said polymer having been prepared by polymerizing 1-butene at a polymerization temperature within the range of about 100 to about 500° F. and a pressure within the range of about 100 to about 700 p.s.i.g. in the presence of a catalyst active for such polymerization and comprising, as the sole essential effective catalytic ingredients thereof, chromium oxide and at least one material selected from the group consisting of silica, alumina, zirconia, and thoria, at least part of the chromium being in the hexavalent state at the initial contacting of hydrocarbon with said catalyst.

4. An oil base drilling fluid according to claim 3 containing from 5 to 50 pounds per barrel of said polymer of 1-butene.

5. An oil base drilling fluid comprising: a hydrocarbon oil at least part of which boils above 400° F. and which is selected from the group consisting of topped crude oil, gas oil, kerosene, diesel fuel, heavy alkylate, fractions of heavy alkylate, and mixtures thereof; a weighting agent; and an amount of a polymer of 1-butene sufficient to reduce the fluid loss due to filtration without increasing the viscosity of said drilling fluid to such an extent that it cannot be circulated, said polymer having been prepared by polymerizing 1-butene at a polymerization temperature within the range of about 100 to about 500° F. and a pressure within the range of about 100 to about 700 p.s.i.g. in the presence of a catalyst active for such polymerization and comprising, as the sole essential effective catalytic ingredients thereof, chromium oxide and at least one material selected from the group consisting of silica, alumina, zirconia, and thoria, at least part of the chromium being in the hexavalent state at the initial contacting of hydrocarbon with said catalyst.

6. An oil base drilling fluid comprising: a hydrocarbon oil at least part of which boils above 400° F. and which is selected from the group consisting of topped crude oil, gas oil, kerosene, diesel fuel, heavy alkylate, fractions of heavy alkylate, and mixtures thereof; a weighting agent; a second drilling fluid additive selected from the group consisting of carbon black, magnesium oxide, and diatomaceous earth; and an amount of a polymer of 1-butene sufficient to reduce the fluid loss due to filtration without increasing the viscosity of said drilling fluid to such an extent that it cannot be circulated, said polymer having been prepared by polymerizing 1-butene at a polymerization temperature within the range of about 100 to about 500° F. and a pressure within the range of about 100 to about 700 p.s.i.g. in the presence of a catalyst active for such polymerization and comprising, as the sole essential effective catalytic ingredients thereof, chromium oxide and at least one material selected from the group consisting of silica, alumina, zirconia, and thoria, at least part of the chromium being in the hexavalent state at the initial contacting of hydrocarbon with said catalyst.

7. In a process for drilling a well, the steps which comprise circulating an oil base drilling fluid through the drilling zone during the drilling operation and incorporating in said drilling fluid a sufficient amount of a polymer of 1-butene to form a thin filter cake on the walls of the drill hole without increasing the viscosity of said fluid to such an extent that it cannot be pumped, said polymer having been prepared by polymerizing 1-butene at a polymerization temperature within the range of about 100 to about 500° F. and a pressure within the range of about 100 to about 700 p.s.i.g. in the presence of a catalyst active for such polymerization and comprising, as the sole essential effective catalytic ingredients thereof, chromium oxide and at least one material selected from the group consisting of silica, alumina, zirconia, and thoria, at least part of the chromium being in the hexavalent state at the initial contacting of hydrocarbon with said catalyst.

8. The process of claim 7 wherein the well is drilled in a low pressure horizon.

9. The process of claim 7 wherein the drilling operation includes the step of removing a core from the well.

10. In a process for drilling a well with well drilling tools wherein there is circulated in the well an oil base drilling fluid, the method of forming a filter cake on the wall of said well to decrease the loss of fluid from said drilling fluid contained therein into surrounding earthen formations which comprises incorporating in said drilling fluid a polymer of 1-butene, prepared by polymerizing 1-butene at a polymerization temperature within the range of about 100 to about 500° F. and a pressure within the range of about 100 to about 700 p.s.i.g. in the presence of a catalyst active for such polymerization and comprising, as the sole essential effective catalytic ingredients thereof, chromium oxide and at least one material selected from the group consisting of silica, alumina, zirconia, and thoria, at least part of the chromium being in the hexavalent state at the initial contacting of said 1-butene with said catalyst, said polymer being present in said drilling fluid in an amount sufficient to lower the fluid loss through the filter cake without increasing the viscosity of said drilling fluid to the extent that it cannot be circulated, and contacting said wall of said well with the resulting drilling fluid to form said filter cake thereon.

References Cited in the file of this patent

UNITED STATES PATENTS

| | | |
|---|---|---|
| 2,073,506 | Voorhees | Mar. 9, 1937 |
| 2,217,926 | Van Campen | Oct. 15, 1940 |
| 2,481,339 | Penfield | Sept. 6, 1949 |
| 2,525,788 | Fontana et al. | Oct. 17, 1950 |
| 2,599,683 | Abrams et al | June 10, 1952 |
| 2,697,071 | Kennedy et al. | Dec. 14, 1954 |
| 2,743,233 | Fischer | Apr. 24, 1956 |
| 2,825,721 | Hogan et al. | Mar. 4, 1958 |